United States Patent [19]

Leon

[11] Patent Number: 5,189,946
[45] Date of Patent: Mar. 2, 1993

[54] SELF-DRAINING COOKING POT

[76] Inventor: John F. Leon, P.O. Box 160, Tryon, N.C. 28782

[21] Appl. No.: 946,408

[22] Filed: Sep. 16, 1992

[51] Int. Cl.⁵ .................................................. A47J 27/00
[52] U.S. Cl. ................................... 99/403; 16/110 A; 99/410; 99/450; 126/369; 126/373; 126/383; 210/245; 210/264; 220/264; 220/912; 222/473; 222/505
[58] Field of Search ................ 99/339, 340, 345, 346, 99/403, 407, 410, 444, 450; 16/110 A, 110 R, 114 A; 126/369, 373, 383, 377, 389; 210/245, 264; 220/912, 264, 756; 222/473, 505; 251/349, 369

[56] References Cited

U.S. PATENT DOCUMENTS

| | | | |
|---|---|---|---|
| 150,191 | 4/1874 | Root | 126/369 |
| 161,092 | 3/1875 | Bates | 126/377 |
| 1,157,910 | 10/1915 | Tomsky | 222/473 |
| 1,272,222 | 7/1918 | Clayton | 99/418 |
| 1,518,142 | 12/1924 | Festenburg | 126/383 |
| 2,118,530 | 5/1938 | Smith | 210/245 |
| 3,150,802 | 9/1964 | Pribyl | 222/473 |
| 3,842,725 | 10/1974 | Sano et al. | 99/403 |
| 4,006,842 | 2/1977 | Bassignani | 222/473 X |
| 4,432,474 | 2/1984 | Hutchi | 222/473 |
| 4,506,657 | 3/1985 | Trolle | 126/373 |
| 4,604,989 | 8/1986 | Kita | 99/413 |
| 4,781,302 | 11/1988 | Pearson | 16/110 A |
| 4,832,226 | 5/1989 | Leon | 220/264 |
| 4,838,244 | 6/1989 | Giles et al. | 99/403 |
| 4,901,633 | 2/1990 | De Longhi | 99/410 X |
| 5,027,697 | 7/1991 | De Longhi | 99/410 X |
| 5,078,800 | 1/1992 | Cahill | 210/464 |

Primary Examiner—Timothy F. Simone
Attorney, Agent, or Firm—Carter & Schnedler

[57] ABSTRACT

A self-draining cooking pot, such as a pasta pot, which facilitates the draining of liquid. A handle assembly includes a valve module which is readily-removable to facilitate cleaning, and a strainer to block the passage of food into the valve while permitting the flow of liquid. Included as part of the removable valve module is a sliding shaft with a resilient sealing member mounted on one end, and the sealing member is spring-biased against a valve seat. The handle assembly also includes a trigger lever for manual actuation of the valve. To prevent inadvertent draining of the pot, a lock-closed device engages the trigger lever until released by a pushbutton. To facilitate removal of the readily-removable valve module, a similar lock-open device is provided for the sliding shaft.

20 Claims, 4 Drawing Sheets

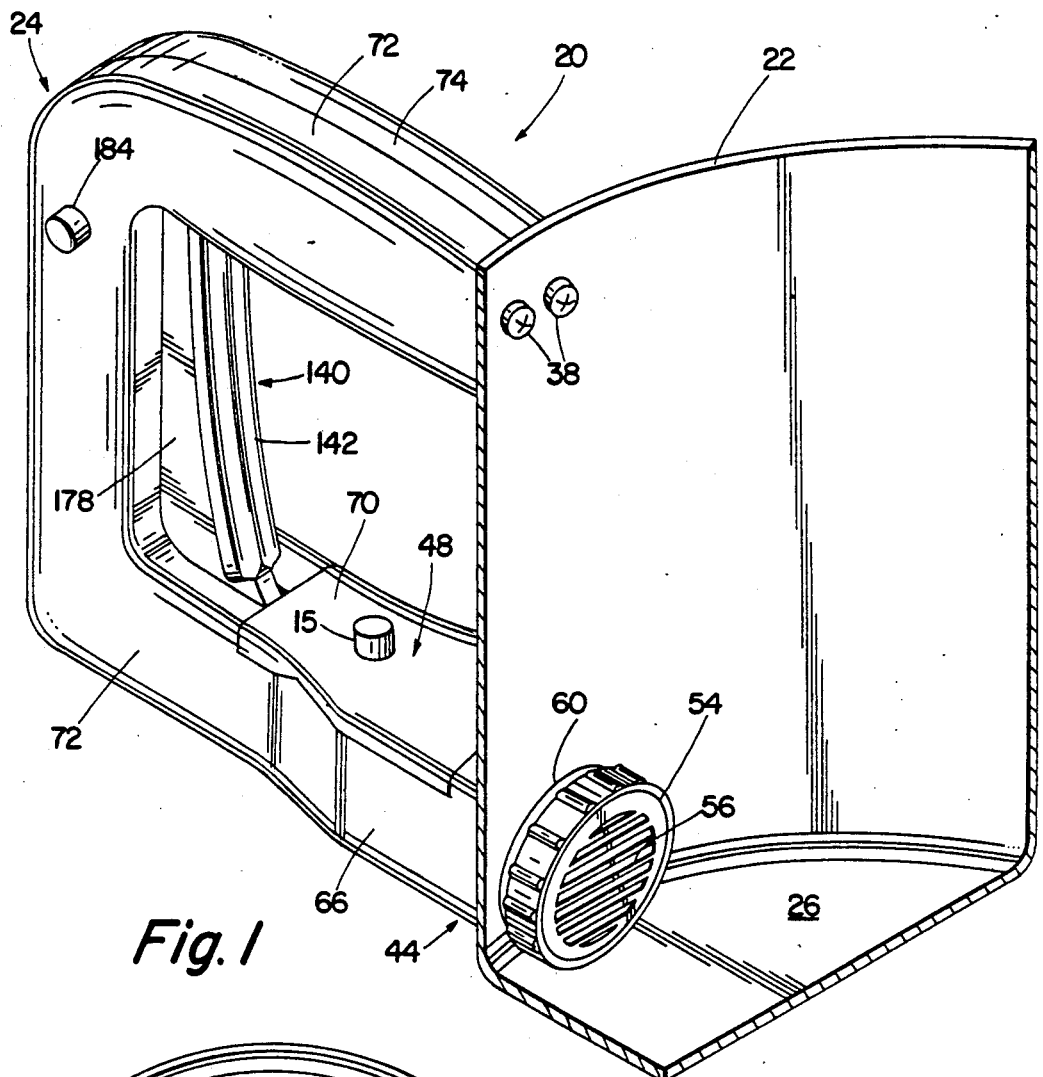
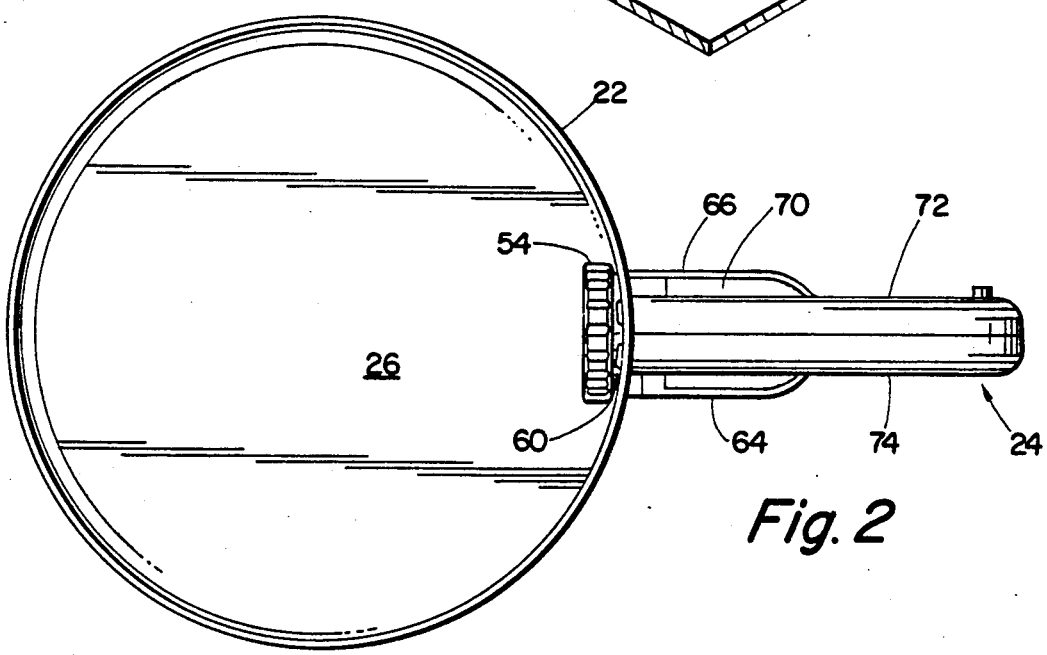

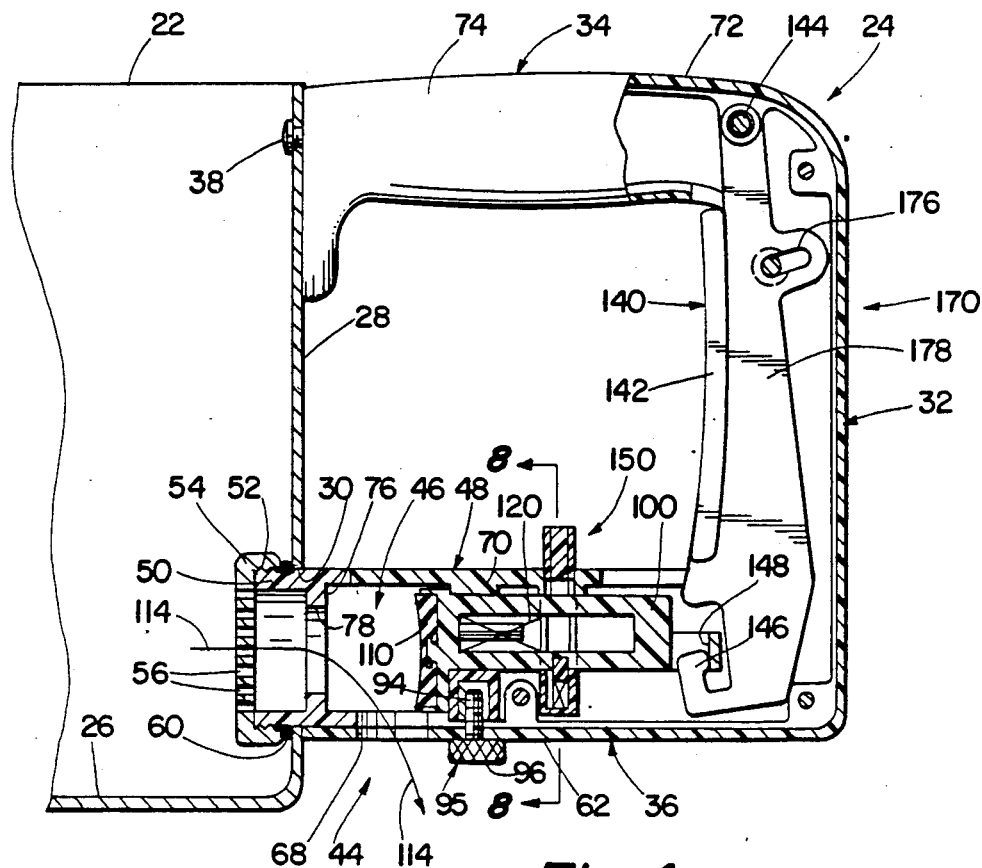
Fig. 4
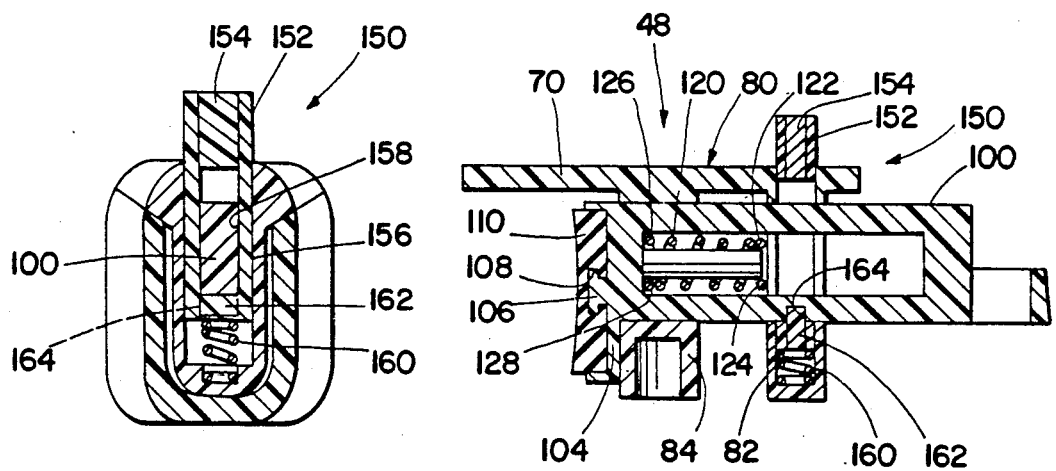
Fig. 8
Fig. 6

SELF-DRAINING COOKING POT

BACKGROUND OF THE INVENTION

The present invention relates generally to cooking pots and, more particularly, to a cooking pot which facilitates the draining of liquid from within the pot as part of a cooking operation.

As is well known, during procedures for cooking certain foods, for example pastas such as spaghetti or noodles, or rice, it is necessary to drain the cooking liquid, normally water, after boiling the food in water for a predetermined length of time. Normally, a separate utensil in the form of a strainer basket is employed for this purpose. The entire contents of the cooking pot are emptied into the strainer basket, with water or other cooking liquid draining through openings in the strainer basket.

Such a procedure necessarily involves a separate utensil, with the attendant use of counter space, and the need for washing the separate utensil after use. One solution to this problem is disclosed in my earlier U.S. Pat. No. 4,832,226, which discloses a cooking pot having a plurality of openings in the bottom of the cooking pot, and a flap-like closure overlying the openings in a sealing arrangement.

SUMMARY OF THE INVENTION

It is an object of the invention to provide an improved self-draining cooking pot which obviates the need for a separate strainer.

It is another object of the invention to provide a self-draining cooking pot including a valve mechanism which is easily removable for cleaning.

It is yet another object of the invention to provide a self-draining cooking pot which is easily drained when such is intended, and yet is resistant to inadvertent draining.

It is yet another object of the invention to provide a self-draining cooking pot which includes a resilient seal or reliably containing fluid during cooking, and wherein the resilient seal is shielded from direct heat from a stove cooktop during a cooking operation.

Briefly, in accordance with the invention a self-draining cooking pot includes a vessel having an aperture in a lower portion of the vessel. In a preferred embodiment, the vessel has a sidewall, and the aperture is located in a lower portion of the sidewall.

A handle assembly is affixed to the vessel, and the handle assembly includes a valve housing portion sealingly engaging portions of the vessel peripheral to the aperture. In one embodiment, the handle assembly is generally U-shaped, having an intermediate bight portion, and two side portions. The handle assembly is fixed to the vessel in an orientation such that the intermediate portion is generally vertical, one of the side portions is a handle upper arm attached to an upper portion of the vessel sidewall, and the other of the side portions is a handle lower arm attached to the lower portion of the sidewall, with the valve housing portion included in the handle lower arm. The valve housing portion has a module-receiving cavity open at the top and including a drain opening at the bottom.

Receivable within the valve housing portion, in particular within the module-receiving cavity, is a valve module. The valve module includes valve elements serving to selectively open and close a fluid flow path between the aperture and the drain opening. In a preferred embodiment, the valve module includes a cover for the module-receiving cavity. It is a feature of the invention that the valve module is readily removable from the valve housing portion to facilitate cleaning.

In accordance with one aspect of the invention, the valve housing portion includes a valve seat which cooperates with the valve elements of the valve module such that the valve housing portion and the valve module together comprise a valve. It is another feature of the invention that all moving parts of the valve are included within the removable valve module.

In the disclosed embodiment, the valve elements included within the valve module received within the module-receiving cavity of the handle lower arm in turn include a sliding shaft having a sealing member mount on one end, with the sliding shaft being a translatable between a forward position and an aft position. A sealing member is mounted on the one end of the sliding shaft so as to sealingly engage the valve seat when the valve module is received within the valve housing portion and the sliding shaft is in the forward position. Preferably, in order to protect the sealing member from direct heat of the cook-top, the sealing member mount includes a cup-like shroud.

The handle assembly additionally may include a manually-operable trigger lever configured to engage the valve elements when the valve module is received within the module-receiving cavity of the valve housing portion such that actuation of the trigger lever causes the fluid flow path to open. To facilitate removal of the valve module for cleaning, the valve module includes a releasable lock-open device to hold the valve elements in a valve-open position. In addition, to prevent inadvertent opening of the fluid flow path, the handle assembly includes a releasable lock-close device to hold the trigger lever in a valve-close position to prevent inadvertent opening of the fluid flow path.

A position over the aperture is a strainer having openings sized to permit the flow of liquid through the aperture while blocking passage of solids larger than the openings within the strainer. In one embodiment, the valve housing portion includes a hollow threaded extension projecting through the aperture into the interior of the vessel, and the strainer comprises a strainer nut screwed onto the hollow threaded extension.

BRIEF DESCRIPTION OF THE DRAWINGS

While the novel features of the invention are set forth with particularity in the appended claims, the invention, both as to organization and to content, will be better understood and appreciated, along with other objects and features thereof, from the following detailed description, taken in conjunction with the drawings, in which:

FIG. 1 is a three-dimensional view of a self-draining cooking pot of the invention, with the cooking vessel portion thereof shown partially in cross section for clarity of illustration;

FIG. 2 is a top plan view of the self-draining cooking pot of FIG. 1;

FIG. 4 is a similar cross-sectional side view showing the valve in its fully open or aft position;

FIG. 6 is a cross-sectional view of the valve module after it has been removed from the handle assembly for cleaning;

FIG. 8 is a cross-section taken along line 8—8 of FIG. 4 showing the releasable lock-open device in its engaged position;

DETAILED DESCRIPTION

Referring initially to FIGS. 1 and 2, a self-draining cooking pot 20 includes a cooking vessel 22 of conventional configuration and a handle assembly, generally designated 24, affixed to the cooking vessel 22. The various constituent parts of the handle assembly 24, described in detail hereinbelow, are generally formed of a suitable high-temperature plastic by conventional molding processes. Exceptions are several springs, which are metal, and a resilient seal, all as described below.

Figure 3:
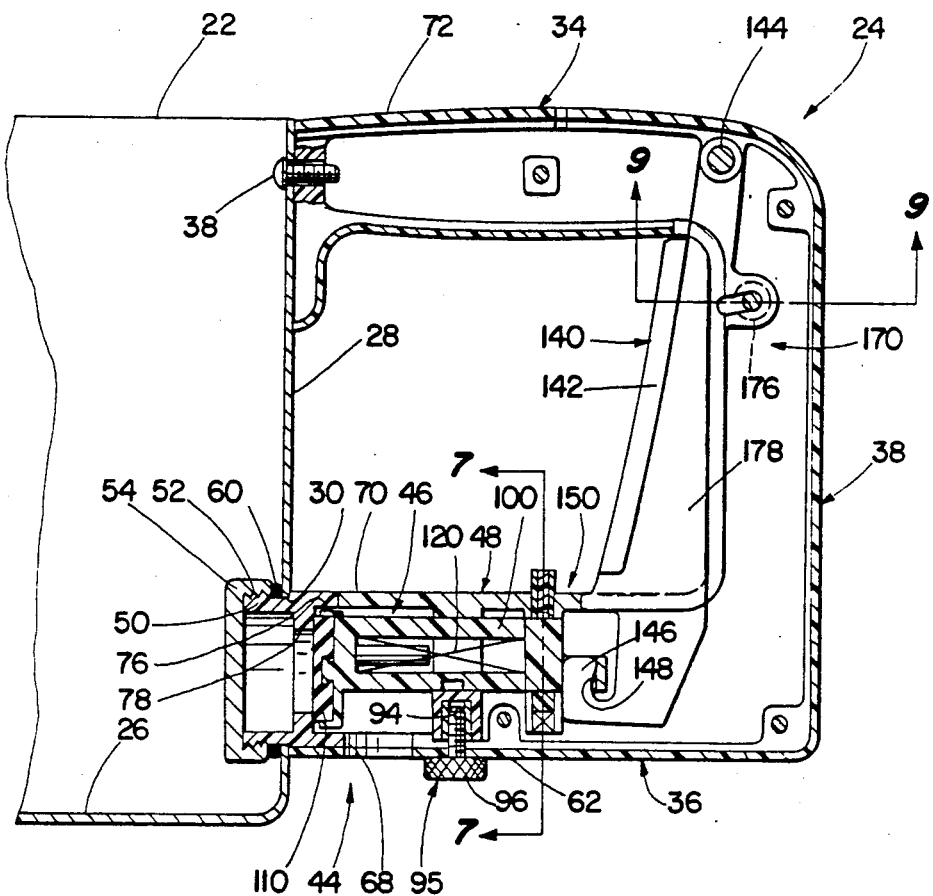
FIG. 3 is a cross-sectional side view of the cooking pot showing the valve in its closed or forward position.
Figure 5:
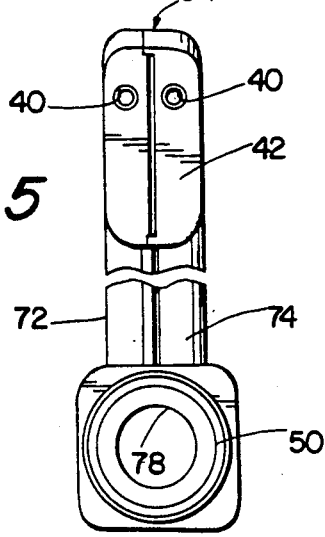
FIG. 5 is an elevational view of the handle assembly as viewed from the cooking vessel side thereof.
Figure 14:
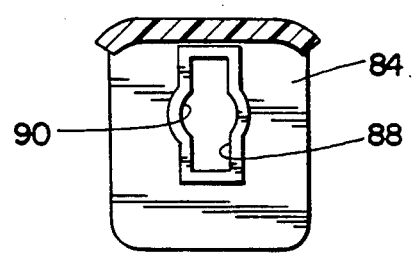
FIG. 14 is a view taken generally along line 14—14 of FIG. 10 showing an intermediate depending bulkhead of the module base.

Referring additionally to FIGS. 3, 4 and 5, the cooking vessel 22 has a solid bottom 26 and a generally cylindrical sidewall 28 having an aperture 30 in a lower portion of the sidewall 28. The handle assembly 24 is generally U-shaped, having an intermediate bight portion 32, and two side portions 34 and 36. The handle assembly 24 is affixed to the cooking vessel 22 in an orientation such that the handle intermediate portion 32 is vertical, one of the side portions 34 comprises a handle upper arm attached to an upper portion of the sidewall 28, and the other of the side portions 36 comprises a handle lower arm attached to the lower portion of the sidewall 28.

The handle 24 upper arm 34 is securely attached to the cooking vessel 22 by means of a pair of screws 38 screwed into suitable apertures 40 within a mounting face portion 42 (FIG. 5) of the handle upper arm 34.

The handle lower arm 34 includes a valve housing portion, generally designated 44, which includes a cavity, generally designated 46, for receiving a removable valve module 48 (shown in isolation in FIG. 6), and additionally includes a hollow threaded extension 50 having external threads 52. A strainer nut 54 includes openings 56 in a suitable pattern and sized to permit the flow of liquid through the aperture 30, while blocking passage of solids larger than the openings 56. The strainer nut 54 has internal threads 58 which are screwed onto the external threads 52 of the hollow threaded extension 50, which thus serves as a conduit.

In order to provide a seal between the valve housing portion 44 and portions of the vessel 22 peripheral to the aperture 30, an O-ring 60 is positioned between the strainer nut 54 and the inside of the cooking vessel 22 such that the O-ring 60 is compressed as the strainer nut 54 is threaded onto the extension 50.

The valve housing portion 44 and, more particularly, the module-receiving cavity 46 formed therein, includes a bottom wall 62, a left sidewall 64 and a right sidewall 66. A drain opening 68 is formed in the bottom wall 62. The top of the module-receiving cavity 46 is open and, during assembled use, is covered by a top plate 70 of the removable module 48 (FIG. 6), as is described in greater detail hereinbelow.

It may be noted that the handle assembly 24 comprises right and left halves 72 and 74 which are not symmetrical. Thus, the hollow threaded extension 50 of the valve housing portion 44 is an integral part of one of the halves, of the right handle half 72 in this particular example.

Also included in the valve housing portion 44, and comprising part of the right handle half 72, is an annular valve seat 76 defining a central aperture 78. The valve seat 76 included as part of the valve housing portion 44 and the removable valve module 48 together comprise a valve. It is a feature of the invention that all moving parts of the thus-constituted valve are included within the removable valve module 48.

With reference now to FIGS. 6 and 10-17, in addition to FIGS. 3 and 4, the construction of the readily removable valve module 48 will now be described.

Figure 10:
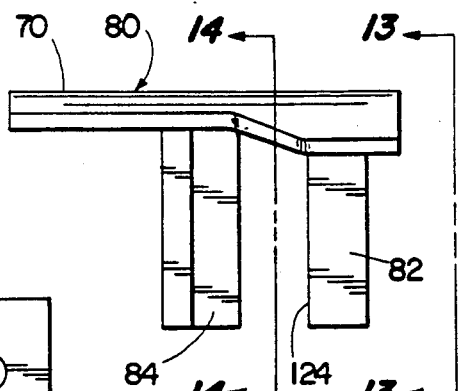
FIG. 10 is a side elevational view of the base portion of the removable module assembly of FIG. 6.
Figure 13:
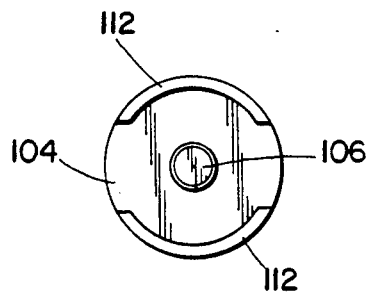
FIG. 13 is a view taken generally along line 13—13 of FIG. 10 showing a rear depending bulkhead of the module base.
Figure 16:
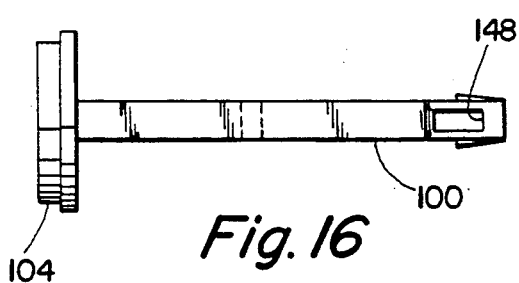
FIG. 16 is a top plan view of the FIG. 15 sliding shaft portion.

The removable module 48 comprises a base 80, perhaps best seen in FIG. 10, and is of one-piece molded plastic construction including the module cover 70 and a pair of apertured, depending bulkheads 82 and 84. The bulkhead 82 is also referred to herein as an aft bulkhead, and the bulkhead 84 is also referred to herein as an intermediate bulkhead. The aft bulkhead 82 (see FIG. 13) includes a rectangular guide slot 86, while the intermediate bulkhead 84 (see FIG. 14) includes a guide slot 88 which is generally rectangular, but which also has an intermediate bulge 90.

For removably securing the module 48 in place, the intermediate bulkhead 84 on its underside (see FIG. 11) has a threaded metal insert 92 for receiving the threaded portion 94 of a retainer screw 95 (FIGS. 3 and 4) having a knurled head 96 to facilitate manual assembly and disassembly of the module 48 into the valve housing portion 44 of the handle 24.

Figures 15, 17:
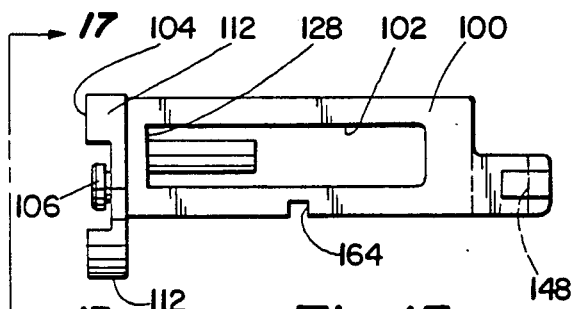
FIG. 15 is a side elevational view of the sliding shaft portion of the removable valve module assembly of FIG. 6.
FIG. 17 is an elevational view taken generally along line 17—17 of FIG. 15 showing the face of the sealing member mount included on the FIG. 15 sliding shaft.

Guided by the slots 86 and 88 in the depending bulkheads 82 and 84 is a sliding shaft 100, also of one-piece molded plastic construction. The sliding shaft 100 is shown in isolation in FIGS. 15 and 16, as part of the removable module in FIG. 6, and in assembled operational condition in FIGS. 3 and 4. The sliding shaft 100 as best seen in FIG. 15 is generally of rectangular frame-like configuration, and includes a rectangular central opening 102, and a circular sealing member mount 104 on one end. The sealing member mount 104 has a knob-like retainer 106 for engaging a suitably-configured retainer cavity 108 of a resilient sealing member 110 (FIGS. 3, 4 and 6), which may comprise silicon rubber or similar material. This configuration forms a positive attachment of the sealing member 110 to the sliding shaft 100, and yet removal of the sealing member 110 is easily accomplished by pulling the sealing member 110 off the knob-like retainer 106 of the sealing member mount 104.

In order to protect the silicon rubber sealing member 110 from heat, the sealing member mount 104 includes a cup-like shroud 112 having upper and lower halves. The cup-like shroud 112 thus provides a barrier between the resilient sealing member 110 and hot, dry air which can enter the drain opening 68 during cooking operations.

The sliding shaft 100 is translatable between a forward or valve-closed position, as may be seen in FIG. 3, where the sealing member 110 engages the valve seat 76 to retain fluid within the cooking vessel 22, and an aft or valve-open position, depicted in FIG. 4, where a fluid flow path 114 is established from the aperture 30, through the aperture 78 to the drain opening 68.

For biasing the sliding shaft 100 and the sealing member 110 towards the forward or valve-closed position of FIG. 3, a compression spring 120 has a rear spring end 122 engaging a forwardly-facing surface 124 of the rear bulkhead 82, and a front spring end 126 engaging a rearwardly-facing surface 128 within the sealing member 100 opening 102. (See also FIG. 15.) To retain the compression spring 120, the sliding shaft 100 includes a cylindrical post 130 extending from the rearwardly-facing surface 128 towards the center of the opening 102. It will be appreciated that the bulge 90 in the slot 88 of the intermediate bulkhead 84 (FIG. 14) provides clearance for the compression spring 120 as it surrounds the post 130. There being no such bulge in the slot 86 in the rear bulkhead 92 (FIG. 13), the sliding shaft 100 is free to translate within the aperture 86, while the rear end 122 of the spring 122 cannot pass through the aperture 86.

For valve operation, included within the handle assembly 24, in particular within the vertical intermediate portion 32 thereof, is a manually-operable trigger lever 140 with a rounded contoured hand-engagement surface 142. The trigger lever 140 has a pivotal mount 144 at its upper end, and a hook-like extension 146 at its lower end, as may be seen in FIGS. 3 and 4. The hook-like extension 146 is configured to engage an aperture 148 (see also FIGS. 15 and 16) in the sliding shaft 100 in a manner which provides positive operation of the valve, and which also permits the sliding shaft 100, together with the rest of the removable module 48, to be readily removed.

Particularly to facilitate removal of the module 48, but additionally as an aid in draining fluid from within the vessel 22, a lock-open device, generally designated 150, is provided. The lock-open device 150 more particularly comprises a push button 152 including a solid insert 154, and a depending U-shaped element 156 (best seen in FIGS. 7 and 8) including a slot 158 through which the sliding shaft 100 passes. The U-shaped element 156 is biased upwardly by a compression spring 160, and the lower portion 162 of the U-shaped locking element 156 is configured so as to be engagable within a notch 164 formed on the underside of the sliding shaft 100.

Figure 7:
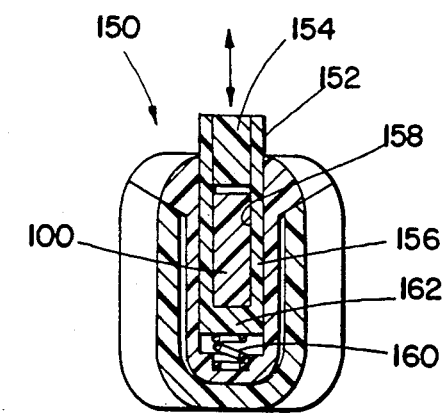
FIG. 7 is a cross-sectional view taken along line 7—7 of FIG. 3 showing a releasable lock-open device for the valve elements when not engaged.
Figure 11:
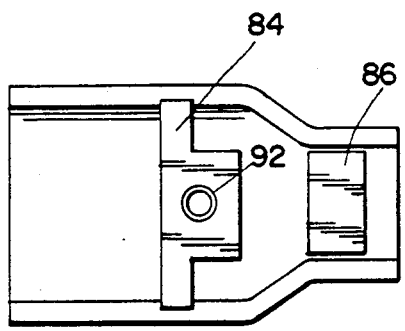
FIG. 11 is a view from the underside of the FIG. 10 module assembly base portion.
Figure 12:
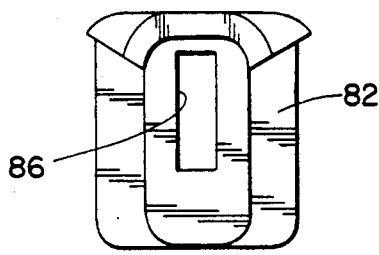
FIG. 12 is a plan view of the right hand portion of the FIG. 10 module assembly base portion.

Engagement of the locking element lower portion 162 within the notch 164 is depicted in FIGS. 4, 6 and 8, where the sliding shaft 100 is shown in its aft position. In the views of FIGS. 3 and 7, where the sliding shaft 100 is shown in its forward position at which the resilient sealing member 110 engages the valve seat 76, the locking element lower portion 162 is not engaged within the slot 164.

Thus, during operation of the releasable lock-open device 150, when the trigger lever 140 is manually pulled, the sliding shaft 100 is pulled towards the aft position of FIG. 4, by means of engagement of the hook-like extension 146 with the aperture 148. In the full-aft position, the compression spring 160 urges the U-shaped element 156 in an upward direction whereupon the lower portion 162 thereof engages the slot 164, to retain the sliding shaft 100 in the aft position, even after the trigger lever 140 is released.

Assuming the trigger lever 140 has been released, when the push button 152 is pushed downwardly, the lower portion 162 of the U-shaped locking device 156 disengages from the slot 164 in the sliding shaft 100, and the sliding shaft 100 and sealing member 110 are then free to move towards the forward position of FIG. 3 under the urging of the compression spring 120, until the sealing member 110 contacts the valve seat 76.

It will be appreciated that, in the full-aft position of FIG. 4, the retainer screw 95 may be manually removed, permitting the removable module 48, including the cover 70 and lock-open device 150, to be readily removed for cleaning. Under these conditions, there is no particular stress or binding where the hook-like extension 146 at the lower end of the trigger lever 140 engages the slot 148.

To prevent inadvertent opening of the fluid flow path and thus inadvertent draining of the vessel 22, there is also provided a releasable lock-closed device, generally designated 170, which holds the trigger lever 140 in the valve-closed position of FIG. 3.

Figure 9:
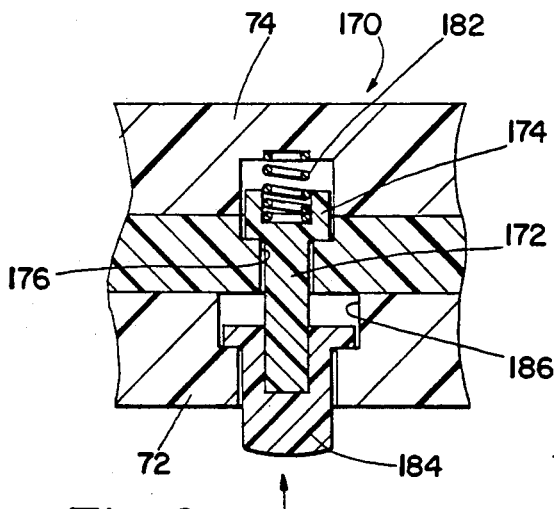
FIG. 9 is a section taken along line 9—9 of FIG. 3 showing a releasable lock-closed device for the trigger lever in its engaged position.

More particularly, and as may best be seen in FIG. 9, the lock-closed device 170 comprises a generally cylindrical lock element 172 having a cup-like enlarged diameter portion 174 at one end. The lock element 172 passes through an arcuate slot 176 (FIGS. 3 and 4) in a generally flat rear portion 178 of the trigger lever 140. In the rear portion 178 located at the rear of the arcuate slot 176 is a counterbore portion 180 configured such that, when the trigger lever 140 is in the full forward position depicted in FIG. 3, the enlarged diameter portion 174 of the cylindrical lock element 172 engages the counterbore 180 under the urging of a compression spring 182.

For releasing the lock-closed device 170, there is provided a push button head 184 captured within a suitably shaped opening 186 within the handle 24 right half 72, and in engagement with the cylindrical lock element 172. Thus, when a user wishes to operate the trigger lever 140 in order to drain the cooking vessel 22, the push button head 184 is first pressed to release the lock-closed device 170, permitting the trigger lever 140 to be pulled toward the aft position.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A self-draining cooking pot comprising:
   a vessel having an aperture in a lower portion of said vessel;
   a handle assembly affixed to said vessel;

said handle assembly including a valve housing portion sealingly engaging portions of said vessel peripheral to said aperture, said valve housing portion having a drain opening; and a valve module receivable within said valve housing portion, said valve module including valve elements serving to selectively open and close a fluid flow path between said aperture and said drain opening, and said valve module being readily removable from said valve housing portion to facilitate cleaning.

2. A self-draining cooking pot in accordance with claim 1, wherein said valve housing portion includes a valve seat which cooperates with said valve elements of said valve module.

3. A self-draining cooking pot in accordance with claim 1, wherein said valve housing portion and said valve module comprise a valve, and all moving parts of said valve are included within said valve module.

4. A self-draining cooking pot in accordance with claim 2, wherein said valve housing portion and said valve module comprise a valve, and all moving parts of said valve are included within said valve module.

5. A self-draining cooking pot in accordance with claim 1, wherein said handle assembly further comprises a manually-operable trigger lever configured to engage said valve elements when said valve module is received within said valve housing portion such that actuation of said trigger lever causes the fluid flow path to open.

6. A self-draining cooking pot in accordance with claim 1, wherein said valve module includes a releasable lock-open device to hold said valve elements in a valve-open position to facilitate removal of said valve module.

7. A self-draining cooking pot in accordance with claim 6, wherein said valve module includes a releasable lock-open device to hold said valve elements in a valve-open position to facilitate removal of said valve module.

8. A self-draining cooking pot in accordance with claim 5, wherein said handle assembly includes a releasable lock-closed device to hold said trigger lever in a valve-closed position to prevent inadvertent opening of the fluid flow path.

9. A self-draining cooking pot in accordance with claim 1, which further comprises a strainer over said aperture including openings sized to permit the flow of liquid through said aperture while blocking passage of solids larger than the openings.

10. A self-draining cooking pot comprising:
a vessel having a sidewall and an aperture in a lower portion of said sidewall;
a generally U-shaped handle assembly having an intermediate bight portion and two side portions affixed to said vessel in an orientation such that the intermediate portion of said handle assembly is vertical, one of the side portions comprises a handle upper arm attached to an upper portion of said sidewall, and the other of the side portions comprise a handle lower arm attached to the lower portion of said sidewall;
said handle lower arm including a valve housing portion sealingly engaging portions of said vessel sidewall peripheral to said aperture, said valve housing portion having a module-receiving cavity open at the top and including a drain opening at the bottom; and a valve module receivable within said module-receiving cavity, said valve module including a cover for said module-receiving cavity and including valve elements serving to selectively open and close a fluid flow path between said aperture and said drain opening, and said valve module being readily removable from said valve housing portion to facilitate cleaning.

11. A self-draining cooking pot in accordance with claim 10, wherein said valve housing portion includes a valve seat which cooperates with said valve elements of said valve module.

12. A self-draining cooking pot in accordance with claim 11, wherein said valve elements comprise:
a sliding shaft having a sealing member mount on one end and translatable between a forward position and an aft position; and
a sealing member mounted on said one end of said sliding shaft so as to sealingly engage said valve seat when said valve module is received within said valve housing portion and said sliding shaft is in the forward position.

13. A self-draining cooking pot in accordance with claim 12, wherein said sealing member mount includes a cup-like shroud.

14. A self-draining cooking pot in accordance with claim 10, wherein said valve housing portion and said valve module comprise a valve, and all moving parts of said valve are included within said valve module.

15. A self-draining cooking pot in accordance with claim 11, wherein said valve housing portion and said valve module comprise a valve, and all moving parts of said valve are included within said valve module.

16. A self-draining cooking pot in accordance with claim 10, wherein said handle assembly further comprises a manually-operable trigger lever configured to engage said valve elements when said valve module is received within said valve housing portion such that actuating of said trigger lever causes the fluid flow path to open.

17. A self-draining cooking pot in accordance with claim 10, wherein said valve module includes a releasable lock-open device to hold said valve elements in a valve-open position to facilitate removal of said valve module.

18. A self-draining cooking pot in accordance with claim 14, wherein said valve module includes a releasable lock-open device to hold said valve elements in a valve-open position to facilitate removal of said valve module.

19. A self-draining cooking pot in accordance with claim 16, wherein said handle assembly includes a releasable lock-closed device to hold said trigger lever in a valve-closed position to prevent inadvertent opening of the fluid flow path.

20. A self-draining cooking pot in accordance with claim 10, wherein
said valve housing portion includes a hollow threaded extension projecting through said aperture into the interior of said vessel; and which further comprises
a strainer nut screwed onto said hollow threaded extension and including openings sized to permit the flow of liquid through said aperture while blocking passage of solids larger than the openings.

* * * * *